United States Patent
Tallapragada et al.

(10) Patent No.: US 10,336,276 B2
(45) Date of Patent: Jul. 2, 2019

(54) ENERGY ABSORBER WITH VARYING STIFFNESS

(71) Applicant: Ford Global Technologies, LLC, Dearborn, MI (US)

(72) Inventors: Srivardhan Tallapragada, Royal Oak, MI (US); Tahmidur Rahman, Canton, MI (US); Linh Doan, Belleville, MI (US); Bhavani Thota, Novi, MI (US); Joseph Edward Abramczyk, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 52 days.

(21) Appl. No.: 15/399,358

(22) Filed: Jan. 5, 2017

(65) Prior Publication Data
US 2018/0186323 A1    Jul. 5, 2018

(51) Int. Cl.
*B60R 21/04* (2006.01)

(52) U.S. Cl.
CPC .. *B60R 21/0428* (2013.01); *B60R 2021/0414* (2013.01)

(58) Field of Classification Search
CPC .............. B60R 21/0428; B60R 2021/0414
See application file for complete search history.

(56) References Cited

U.S. PATENT DOCUMENTS

| | | | |
|---|---|---|---|
| 3,400,979 A * | 9/1968 | James | B60N 2/78 297/411.21 |
| 3,791,693 A * | 2/1974 | Hellriegel | B60J 5/0411 293/128 |
| 4,786,100 A | 11/1988 | Kleemann et al. | |
| 4,890,877 A * | 1/1990 | Ashtiani-Zarandi | B32B 3/30 296/146.7 |
| 5,040,335 A * | 8/1991 | Grimes | B60J 5/0451 296/146.2 |
| 5,098,124 A * | 3/1992 | Breed | B60R 21/04 267/91 |

(Continued)

FOREIGN PATENT DOCUMENTS

| CA | 2194195 A1 | 6/1998 |
|---|---|---|
| CN | 105539348 A | 5/2016 |

(Continued)

OTHER PUBLICATIONS

Search Report from United Kingdom Intellectual Property Office dated Jun. 20, 2018 regarding Application No. GB1800042.2 (4 pages).

*Primary Examiner* — Laura Freedman
(74) *Attorney, Agent, or Firm* — Frank A. MacKenzie; Bejin Bieneman PLC

(57) ABSTRACT

A vehicle door includes a door inner and a trim panel fixed to the door inner. An energy absorber having a vehicle-rearward end and a vehicle-forward end is disposed between the door inner and the trim panel and elongated in a vehicle-forward direction from the vehicle-rearward end to the vehicle-forward end. The energy absorber includes a first energy-absorbing component defining a cavity facing the trim panel, and a second energy-absorbing component disposed in the cavity. The energy absorber has a stiffness that decreases in the vehicle-forward direction.

21 Claims, 5 Drawing Sheets

(56) References Cited

U.S. PATENT DOCUMENTS

| | | | | |
|---|---|---|---|---|
| 5,141,279 A * | 8/1992 | Weller | B60R 21/0428 | 280/751 |
| 5,395,135 A * | 3/1995 | Lim | B60J 5/0451 | 280/751 |
| 5,433,478 A * | 7/1995 | Naruse | B60R 21/0428 | 280/751 |
| 5,542,738 A * | 8/1996 | Walker | B60J 5/0451 | 296/146.6 |
| 5,573,272 A * | 11/1996 | Teshima | B60R 21/0428 | 280/751 |
| 5,636,866 A * | 6/1997 | Suzuki | B60R 21/04 | 188/376 |
| 5,857,702 A * | 1/1999 | Suga | B60J 5/0451 | 188/377 |
| 5,871,253 A * | 2/1999 | Erber | B60J 5/0451 | 296/146.6 |
| 6,203,096 B1 * | 3/2001 | Noda | B60J 5/0451 | 280/751 |
| 6,543,838 B1 * | 4/2003 | Bertolini | B60J 5/0451 | 280/751 |
| 6,550,850 B2 * | 4/2003 | Laborie | B60R 21/04 | 188/371 |
| 6,568,743 B1 * | 5/2003 | Jayasuriya | B60N 2/42727 | 296/153 |
| 7,445,270 B2 * | 11/2008 | Wakou | B60R 21/0428 | 296/146.7 |
| 7,726,727 B2 * | 6/2010 | Bhattacharjee | B60J 5/0452 | 296/146.6 |
| 7,871,119 B2 | 1/2011 | Schoemann et al. | | |
| 7,997,637 B2 * | 8/2011 | Suzuki | B60R 21/0428 | 296/146.7 |
| 8,011,717 B2 * | 9/2011 | Endo | B60J 5/0451 | 296/146.7 |
| 8,029,041 B2 * | 10/2011 | Hall | B60J 5/0451 | 296/146.6 |
| 8,056,962 B2 * | 11/2011 | Tauchi | B60R 21/04 | 280/751 |
| 8,118,347 B2 * | 2/2012 | Kawashima | B60R 21/04 | 296/187.05 |
| 8,152,218 B2 * | 4/2012 | Hall | B60J 5/0452 | 296/146.6 |
| 8,201,671 B2 * | 6/2012 | Cho | B60R 21/0428 | 188/377 |
| 8,215,699 B2 * | 7/2012 | Suzuki | B60J 5/0451 | 296/146.6 |
| 8,454,053 B2 * | 6/2013 | Sun | B60R 21/0428 | 280/751 |
| 8,733,819 B1 * | 5/2014 | Le | B60J 5/0461 | 296/146.6 |
| 8,960,774 B2 * | 2/2015 | Sakhare | B62D 25/02 | 280/748 |
| 9,259,995 B2 * | 2/2016 | Steinbrecher | B60R 13/0243 | |
| 9,266,489 B2 * | 2/2016 | Smith | B60R 21/0428 | |
| 9,452,727 B2 * | 9/2016 | Hase | B60R 21/0428 | |
| 9,815,232 B2 * | 11/2017 | Nabeshima | B29C 44/022 | |
| 2005/0194806 A1 * | 9/2005 | Cowelchuk | B60N 2/78 | 296/1.09 |
| 2006/0097545 A1 | 5/2006 | Cowelchuk et al. | | |
| 2008/0012384 A1 | 1/2008 | Sielhorst et al. | | |
| 2009/0289470 A1 | 11/2009 | Dix et al. | | |
| 2010/0259036 A1 | 10/2010 | Taracko | | |
| 2014/0151171 A1 | 6/2014 | Sato et al. | | |
| 2014/0265429 A1 | 9/2014 | Deng et al. | | |
| 2015/0115585 A1 | 4/2015 | Smith et al. | | |
| 2016/0059678 A1 * | 3/2016 | Tamaoki | B60J 5/0416 | 49/501 |

FOREIGN PATENT DOCUMENTS

| | | | | |
|---|---|---|---|---|
| EP | 1352791 A1 * | 10/2003 | | B60J 5/0451 |
| GB | 2435917 A1 | 9/2007 | | |
| JP | 09071200 A * | 3/1997 | | |
| JP | 10250514 A * | 9/1998 | | B60R 21/0428 |
| JP | 2000177518 A | 6/2000 | | |
| JP | 2008174045 A | 7/2008 | | |
| JP | 2011042314 A * | 3/2011 | | |

* cited by examiner

ENERGY ABSORBER WITH VARYING STIFFNESS

BACKGROUND

There may be limited space between an occupant of a vehicle and a vehicle door or vehicle body side and trim panel, including but not limited to a quarter panel. Side impacts to a vehicle may result in the vehicle door or vehicle body side, the trim panel and/or the quarter panel collapsing into a passenger cabin of the vehicle. The National Highway Traffic Safety Administration's (NHTSA) Federal Motor Vehicle Safety Standard (FMVSS) 214 for "Side Impact Protection" was adopted to evaluate occupant protection during side impact events.

DETAILED DESCRIPTION

Figure 1:
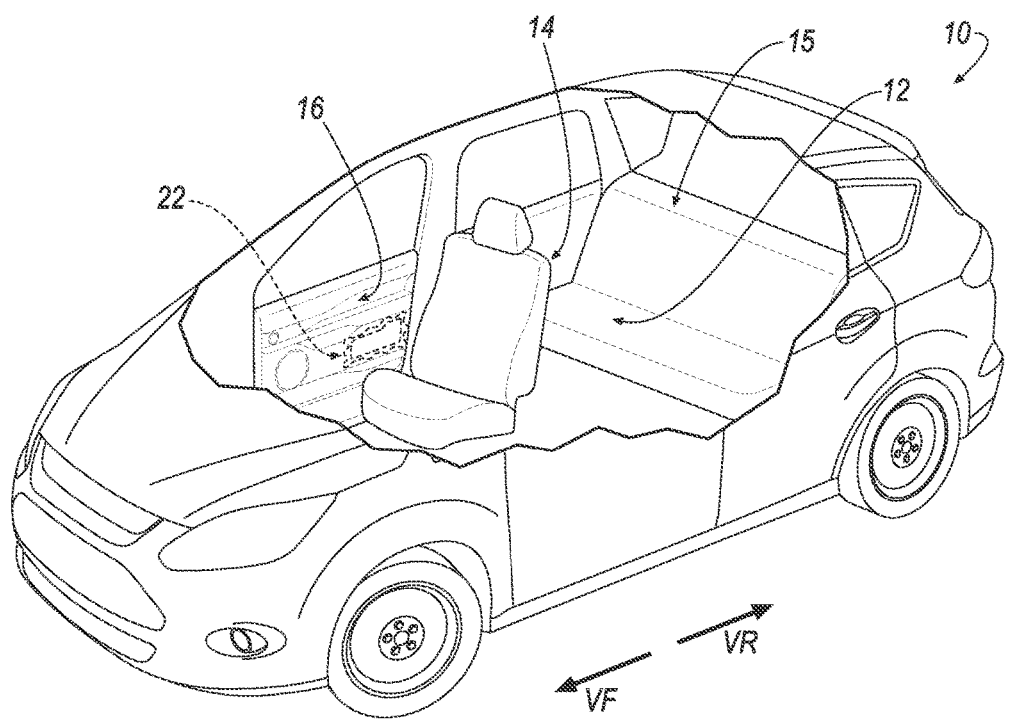
FIG. 1 is a perspective view of a vehicle partially cut away to show a passenger cabin, a front passenger seat, a vehicle door and an example of an energy absorber in the vehicle door.

With reference to the Figures, wherein like numerals indicate like parts throughout the several views, a vehicle 10 includes a passenger cabin 12, a front passenger seat 14, and a vehicle door 16, as shown in FIG. 1. The vehicle door 16 includes a door inner 18 and a trim panel 20.

The trim panel 20 is fixed to the door inner 18 in any suitable way, e.g., threaded fasteners, clips, push-pins, Christmas tree fasteners, etc. The door inner 18 may be formed of metal (e.g., aluminum, steel, etc.), composite material (e.g., fiber reinforced thermoplastic, sheet molding compound (SMC), etc., or any suitable material. The trim panel 20 may be formed of plastic, foam, leather, vinyl, etc. and combinations thereof. The trim panel 20 may have a class-A surface facing the passenger cabin 12, i.e., a surface specifically manufactured to have a high-quality, finished, aesthetic appearance free of blemishes.

When the vehicle door 16 is assembled, an energy absorber 22 is disposed between the door inner 18 and the trim panel 20. Specifically, the door inner 18 and the trim panel 20 may define a cavity (not numbered) therebetween, and the energy absorber 22 may be disposed in the cavity. The trim panel 20 may be fixed to the door inner 18. As one example, the energy absorber 22 may be fixed to the trim panel 20, as set forth further below.

The energy absorber 22 is elongated in a vehicle-forward direction VF, and includes a vehicle-rearward end 24 and a vehicle-forward end 26. The energy absorber 22 includes a first energy-absorbing component 28 and a second energy-absorbing component 44. The first energy-absorbing component 28 defines a cavity 30. For example, the first energy-absorbing component 28 may include side walls 32 and a rear wall 34. The side walls 32 may extend from the rear wall 34 to define the cavity 30. The cavity 30 of the first energy-absorbing component 28 of the energy absorber 22 faces the trim panel 20 when the vehicle door 16 is assembled, i.e., an opening 74 of the cavity 30 (numbered in FIGS. 3-9) is open to the trim panel 20.

As further discussed below, the energy absorber 22 has a stiffness that decreases in the vehicle-forward direction VF. By decreasing the stiffness of the energy absorber 22 in the vehicle-forward direction VF, the energy absorber 22 may absorb energy from occupants of different sizes during, e.g., a side impact event.

Figure 2:
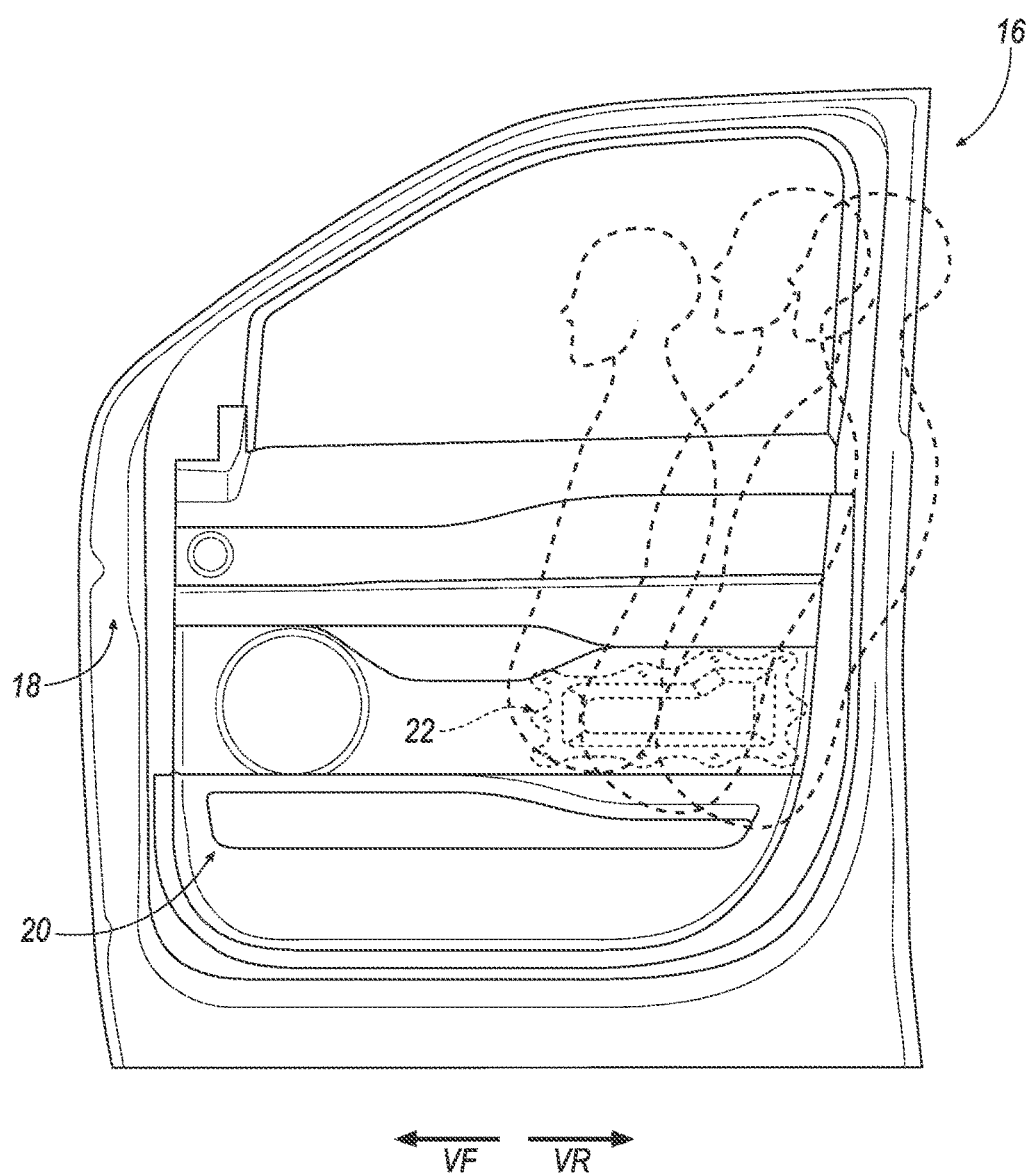
FIG. 2 is a side view of the vehicle door including occupants of different sizes and their seating positions relative to the example of the energy absorber of FIG. 1.

For example, as shown in FIG. 2, occupants of different sizes may be seated in the front passenger seat 14 (not shown in FIG. 2) proximate the vehicle door 16. Larger occupants may adjust, i.e., locate, the front passenger seat 14 in a vehicle-rearward position relative to a location of the front passenger seat 14 for smaller occupants. As a result, larger occupants may be proximate the vehicle-rearward end 24 of the energy absorber 22 relative to smaller occupants, while smaller occupants may be proximate the vehicle-forward end 26 of the energy absorber 22 relative to larger occupants. Thus, the stiffness of the energy absorber 22 may be higher for larger occupants relative to smaller occupants. In this way, during, e.g., a side impact event, the energy absorber 22 may be tailored to better absorb energy from occupants of different sizes.

As shown in FIG. 1, the passenger cabin 12 of the vehicle 10 may include vehicle seats in addition to the front passenger seat 14. For example, a vehicle seat (not shown) may be arranged in a front row of the vehicle 10 adjacent the front passenger seat 14. In addition, the passenger cabin 12 of the vehicle 10 may include a rear seat 15 (or rear seats) located behind the front row relative to the vehicle-forward direction VF. The vehicle 10 may include any number of vehicle seats arranged in any number of rows.

One or more of the vehicle seats may be proximate other vehicle doors. In FIG. 1, for example, the energy absorber 22 is shown disposed in the vehicle door 16 proximate the front passenger seat 14. In addition, or in the alternative, the energy absorber 22 may be disposed in other vehicle doors, vehicle side bodies, quarter panels and trim components, including those proximate other vehicle seats, etc. The vehicle 10 may be of any suitable type, including a car, truck, SUV, etc.

Figure 3:
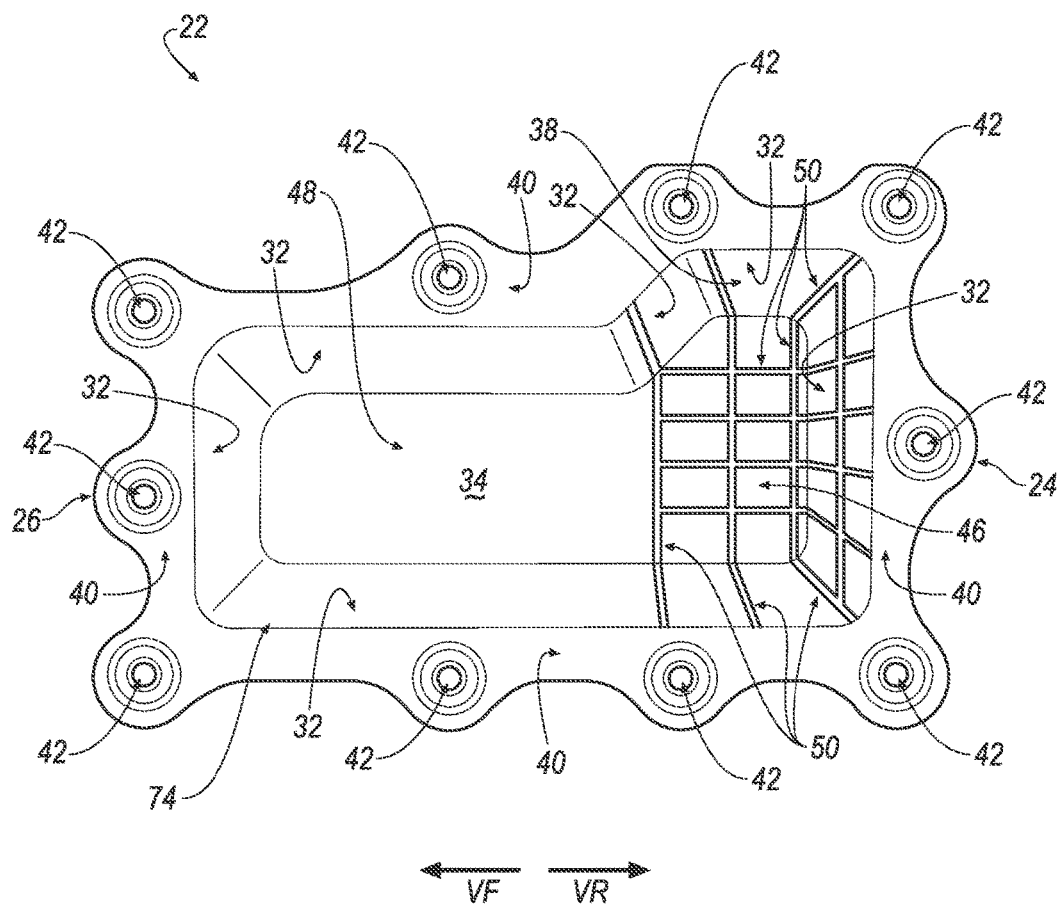
FIG. 3 is a side view of another example of an energy absorber.

Referring to FIG. 3, an example of the energy absorber 22 is shown. As discussed above, the energy absorber 22 is elongated in the vehicle-forward direction VF, and includes the vehicle-rearward end 24 and the vehicle-forward end 26.

The energy absorber 22 includes the first energy-absorbing component 28 and the second energy-absorbing component 44.

The first energy-absorbing component 28 defines the cavity 30. For example, the first energy-absorbing component 28 may include the side walls 32 and the rear wall 34. The side walls 32 may extend from the rear wall 34 to define the cavity 30. As shown in FIGS. 4-9, the side walls 32 may extend from the rear wall 34 in the cavity 30 at an angle A equal to or greater than 90 degrees, e.g. 100 degrees.

As shown in FIGS. 2-3, the first energy-absorbing component 28 may include an upward extension 38. For example, the side walls 32 and rear wall 34 of the first energy-absorbing component 28 may extend in a direction toward a vehicle roof (not shown) at the vehicle-rearward end of the energy absorber 22. In other words, the first energy-absorbing component 28 widens in a direction transverse to the vehicle-forward direction VF, e.g., perpendicular to the vehicle-forward direction VF. The cavity 30 may extend into the upward extension 38. The second energy-absorbing component 44 is disposed in the cavity 30 of the first energy-absorbing component 28. The cavity may include a first portion 46 proximate the vehicle-rearward end 24 of the energy absorber 22, and a second portion 48 proximate the vehicle-forward end 26. The first portion 46 may be taller, i.e., in a vertical direction, than the second portion 48. The upward extension 38 of the energy absorber 22 may assist in absorbing energy from occupants, such as larger occupants, that locate, e.g., the front passenger seat 14 proximate the vehicle-rearward end 24 of the energy absorber 22.

The first energy-absorbing component 28 may include a flange 40. The flange 40 may extend from the side walls 32. The flange 40 may include openings 42. The openings 42 may be spaced from each other along the flange 40. The openings 42 may receive fasteners, etc., for mounting the energy absorber 22 to, e.g., an inner surface (not numbered) of the trim panel 20. In addition, or in the alternative, the energy absorber 22 may be mounted to the trim panel 20, for example, via the flange 40, in any suitable manner, such as with adhesives, chemical welding, staples, and the like, and combinations thereof.

The first energy-absorbing component 28 may be constructed from one or more types of materials. When constructed of more than one type of material, the different types of materials may have different mechanical properties, such as density, stiffness, brittleness, ductility, elasticity, flexibility, hardness, resilience, shear strength, tensile strength, etc. For example, the first energy-absorbing component 28 may be constructed from a plastic, e.g., polyurethane, polypropylene and polystyrene, from compressed fibers, from metal, e.g., aluminum, etc.

Figure 4:
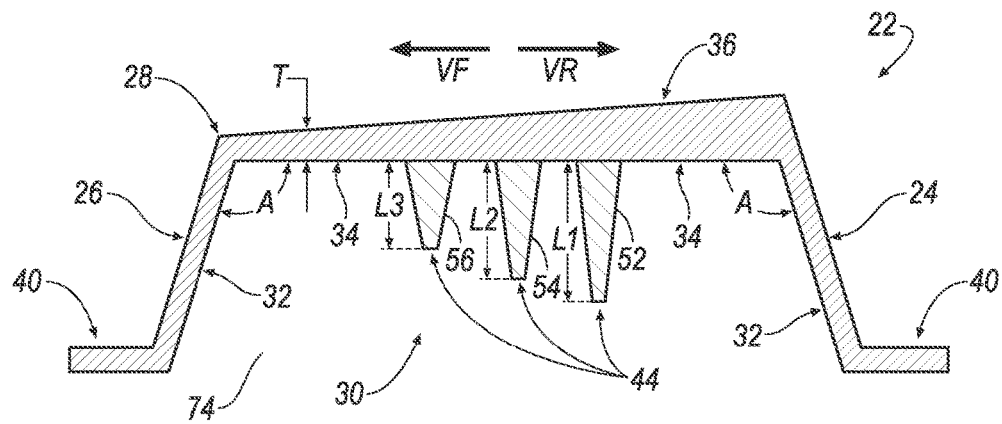
FIG. 4 is a cross-sectional view of another example of an energy absorber, with the cross-section taken from a vehicle-rearward end to a vehicle-forward end of the energy absorber.

Referring to FIG. 4, for example, the side walls 32 and the rear wall 34 of the first energy-absorbing component 28 may be constructed from the same material, e.g., aluminum. The wall thickness T of the side walls 32 and/or the rear wall 34 may decrease in a direction from the vehicle-rearward end 24 to the vehicle-forward end 26. In other words, more material may be used to construct the first energy-absorbing component 28 proximate the vehicle-rearward end 24 of the energy absorber 22 relative to the amount of material used to construct the first energy-absorbing component 28 proximate the vehicle-forward end 26. As a result, the first energy-absorbing component 28, e.g., the rear wall 34, of the vehicle-rearward end 24 of the energy absorber 22 may have a greater thickness T than the first energy-absorbing component 28 proximate the vehicle-forward end 26. In this way, the energy absorber 22 may have a stiffness that decreases in the vehicle-forward direction VF.

In addition, or in the alternative, the side walls 32 and rear wall 34 of the first energy-absorbing component 28 may be constructed from more than one material. The different materials may have different mechanical properties, as discussed above.

Figure 5:
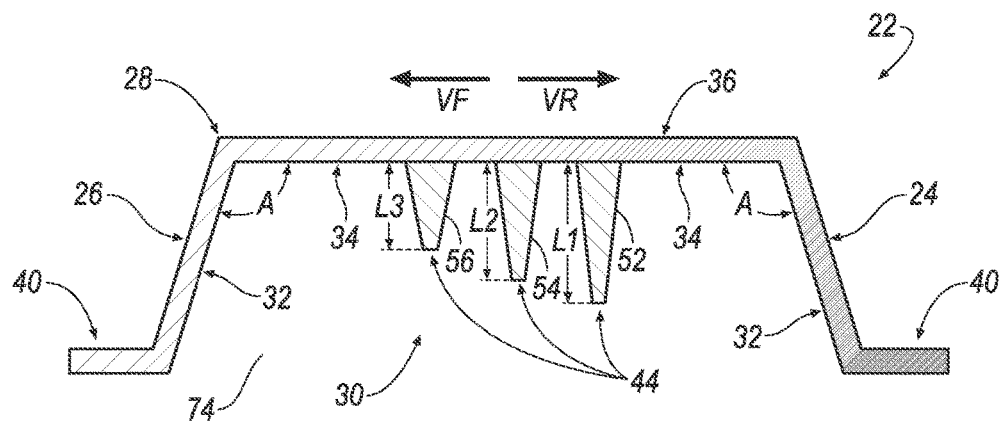
FIG. 5 is a cross-sectional view of another example of an energy absorber, with the cross-section taken from a vehicle-rearward end to a vehicle-forward end of the energy absorber.

For example, as shown in FIG. 5, the side wall 32 and rear wall 34 of the first energy-absorbing component 28 proximate the vehicle-rearward end 24 of the energy absorber 22 are constructed from a material, e.g., polypropylene, having a higher density than a material used to construct the side walls 32 and rear wall 34 of the first energy-absorbing component 28 proximate the vehicle-forward end 26, e.g., polyurethane. This change in density is identified with cross-hatching in FIG. 5. In this way, the energy absorber 22 may have a stiffness that decreases in the vehicle-forward direction VF.

Figure 9:
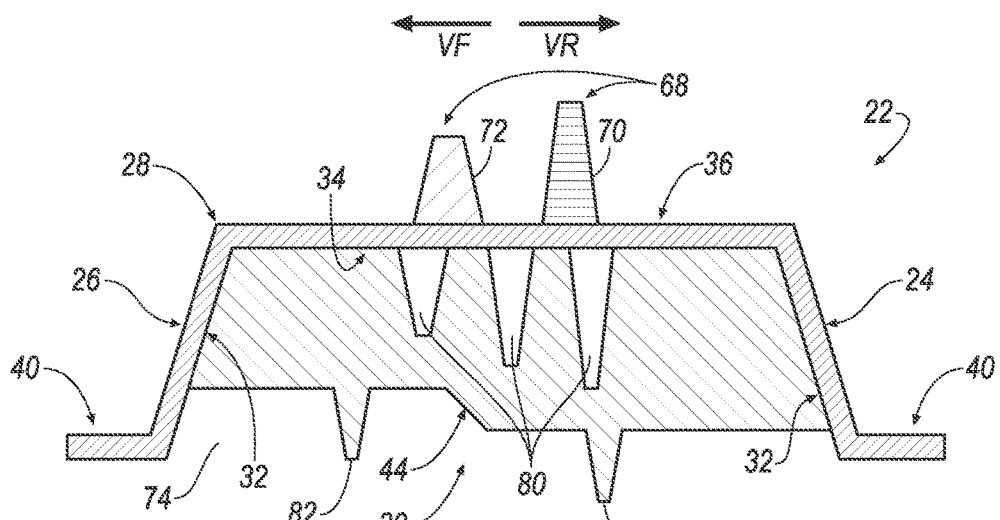
FIG. 9 is a cross-sectional view of another example of an energy absorber, with the cross-section taken from a vehicle-rearward end to a vehicle-forward end of the energy absorber.

The energy absorber 22 also includes the second energy-absorbing component 44. As shown in FIG. 9, the second energy-absorbing component 44 may extend through the opening 74 in the cavity 30, i.e., may extend out of the cavity 30.

Referring back to FIG. 3, the second energy-absorbing component 44 may include ribs 50. The ribs 50 may be spaced from each other and elongated transversely to the vehicle-forward direction VF. The spacing between the transversely elongated ribs 50 may increase in the vehicle-forward direction VF. That is, the transversely elongated ribs 50 located in a vehicle-forward position may be spaced further apart than the transversely elongated ribs 50 adjacent the vehicle-rearward end 24. The second energy-absorbing component 44 may also include ribs 50 spaced from each other and elongated in the vehicle-forward direction VF. The second portion 48 of the cavity 30 may be devoid of ribs 50. The ribs 50 may be constructed from the same or different materials then the first energy-absorbing component 28. Moreover, as discussed above in reference to the first energy-absorbing component 28, the second energy-absorbing component 44, e.g., the ribs 50, may be constructed from one or more materials. The one or more materials may have different material and/or mechanical properties, such as density, stiffness, brittleness, ductility, elasticity, flexibility, hardness, resilience, shear strength, tensile strength, etc. For example, the second energy-absorbing component 44, e.g., the ribs 50, may be constructed from a plastic, e.g., polyurethane, polypropylene and polystyrene, from compressed fibers, from metal, e.g., aluminum, etc.

Figure 6:
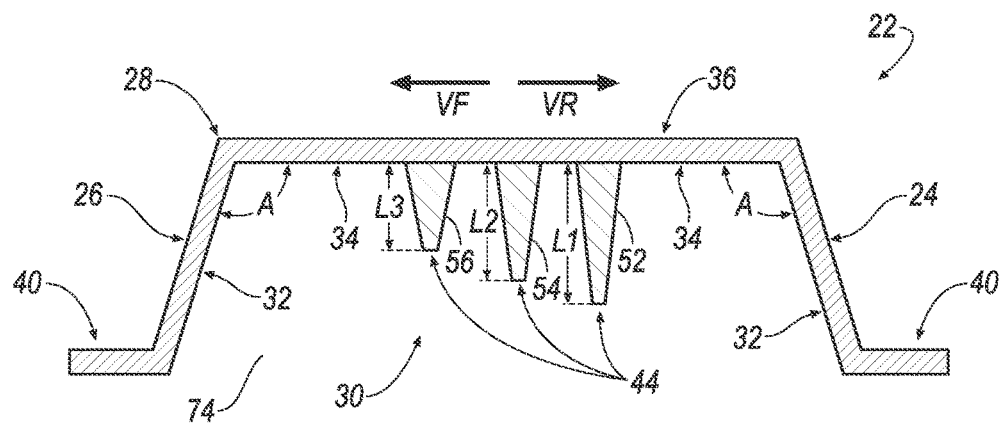
FIG. 6 is a cross-sectional view of another example of an energy absorber, with the cross-section taken from a vehicle-rearward end to a vehicle-forward end of the energy absorber.

With reference to FIGS. 4-6, the second energy-absorbing component 44 may include a first component 52, a second component 54, and a third component 56. The components 52, 54, 56 may be elongated in a direction from the rear wall 34 toward the opening 74, and may taper in the direction from the rear wall 34 toward the opening 74. The components 52, 54, 56 may extend entirely across the cavity 30 from one side wall 32 to another side wall 32. As another example, the components 52, 54, 56 may be spaced from the side walls 32. The first component 52 is disposed in the cavity 30 in a vehicle-rearward direction VR relative to the second and third components 54, 56. The third component 56 is disposed in the cavity 30 in the vehicle-forward direction VF relative to the first and second components 52, 54. The second component 54 is disposed between the first component 52 and the second component 56.

The first component 52, the second component 54, and the third component 56 may have lengths L1, L2, L3, respectively, in a direction from the rear wall 34 toward the opening 74. The length L1 of the first component 52 may be greater than the length L2 of the second component 54; and the length L2 of the second component 54 may be greater than the length L3 of the third component 56.

As shown in FIGS. 4-6, the first component 52 may include a first amount of a material; the second component 54 may include a second amount of the material, and the third component 56 may include a third amount of the material. The first, second, and third amounts of material may be, for example, foamed polypropylene. The first, second, and third amounts may each be measured by volume and/or weight.

As shown in FIG. 6, the second energy-absorbing component 44 may decrease in thickness in the vehicle-forward direction VF. For example, as set forth above, the first length L1 may be greater than the second length L2; and the second length L2 may be greater than the third length L3.

Figure 7:
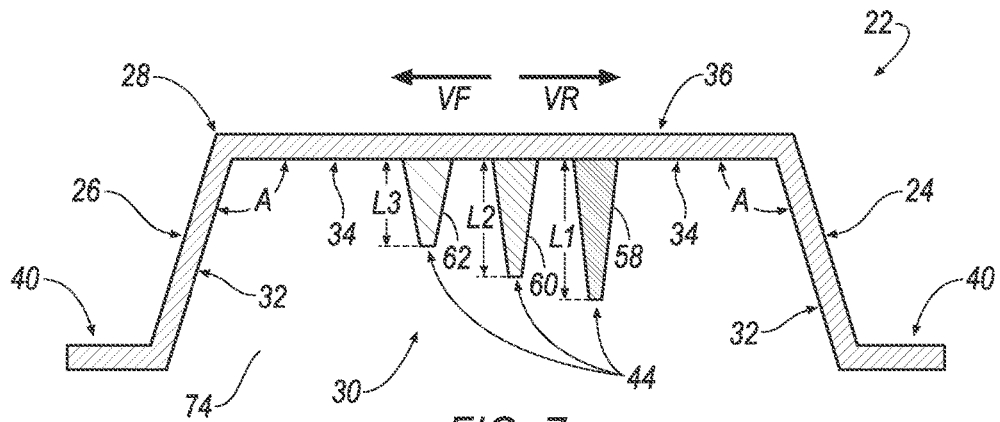
FIG. 7 is a cross-sectional view of another example of an energy absorber, with the cross-section taken from a vehicle-rearward end to a vehicle-forward end of the energy absorber.

The second energy-absorbing component 44 may also include different types of materials. As shown in FIG. 7, the second energy-absorbing component 44 may include a first material type 58, a second material type 60, and a third material type 62. Specifically, the first component 52 may be of the first material type 58; the second component 54 may be of the second material type 60; and the third component 56 may be of the third material type 62. The first material type 58 is disposed in the cavity 30 in a vehicle-rearward direction VR relative to the second and third material types 60, 62. The third material type 62 is disposed in the cavity 30 in the vehicle-forward direction VF relative to the first and second material types 58, 60. The second material type 60 is disposed between the first material type 58 and the third material type 62.

For example, the first material type 58 may be metal, e.g., aluminum; the second material type may be plastic, e.g., polystyrene; and the third material type 62 may be another plastic, e.g., extruded polypropylene. In this example, the first material type 58 has a higher density than the second material type 60; and the second material type 60 has a higher density than the third material type 62.

Figure 8:
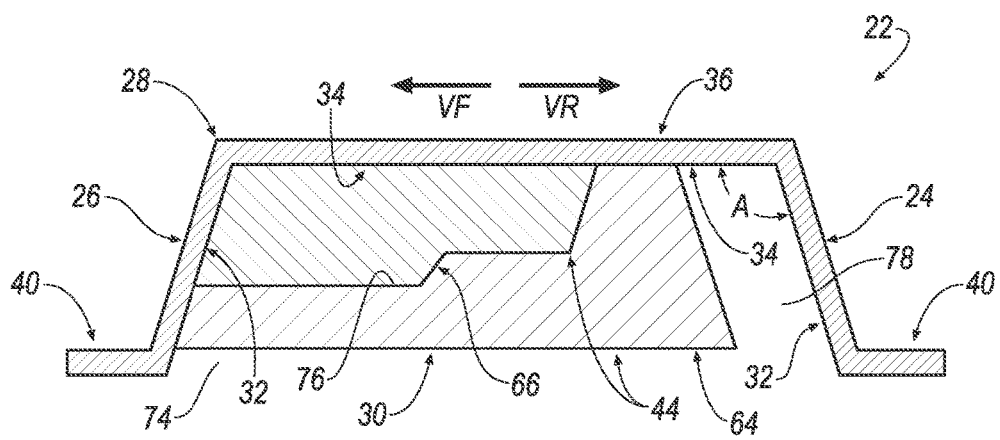
FIG. 8 is a cross-sectional view of another example of an energy absorber, with the cross-section taken from a vehicle-rearward end to a vehicle-forward end of the energy absorber.

Referring to FIG. 8, the second energy-absorbing component 44 may include a first material 64 that decreases in thickness in the vehicle-forward direction VF, and a second material 66 that increases in thickness in the vehicle-forward direction VF. The first material 64 and the second material 66 abut at an interface 76 that extends, at least partially, in the vehicle-forward and vehicle-rearward directions VF, VR. The first material 64 and the second material 66 may be fixed to each other along the interface 76. The first and second materials 64, 66 are disposed in the cavity 30 of the first energy-absorbing component 28, and, as discussed above, may have different mechanical properties, e.g., stiffness. For example, the first material 64 may be stiffer than the second material 66. The first and second materials 64, 66 may abut the side wall 32 at the vehicle-forward end 26, and may be spaced from the side wall 32 at the vehicle-rearward end 24. Specifically, a gap 78 may space the side wall 32 at the vehicle-rearward end 24 from the first and second materials 64, 66.

The energy absorber 22 may also include a third energy-absorbing component 68, as shown in FIG. 9. For example, the rear wall 34 of the first energy-absorbing component 28 includes an outer surface 36. The third energy-absorbing component 68 may be disposed on the outer surface 36 of the rear wall 34. In this embodiment, the second energy-absorbing component 44 may include voids 80 adjacent the rear wall 34, and or may include extensions 82 extending toward the opening 74. One or more of the extensions 82 may extend through the opening 74, i.e., out of the cavity 30.

The third energy-absorbing component 68, like the first and second energy-absorbing components 28, 44, may be constructed from one or more materials. Moreover, the one or more materials may have different mechanical properties, as discussed above. For example, the third energy-absorbing component 68 may be constructed from a plastic, e.g., polyurethane, polypropylene and polystyrene, from compressed fibers, from metal, e.g., aluminum, etc.

As shown in FIG. 9, the third energy-absorbing component 68 may have a thickness, e.g., in the direction transverse to the vehicle-forward direction VF, and the thickness may decrease in the vehicle-forward direction VF. For example, the third energy-absorbing component 68 may include a first material 70, and a second material 72. The first material 70 is elongated further in the direction transverse to the vehicle-forward direction VF than the second material 72.

As discussed above, the third energy-absorbing component 68 may include the first material 70 and the second material 72. The first material 70, e.g., metal, may be disposed in a vehicle-forward direction VR relative the second material 72, e.g., compressed fibers.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle door comprising:
a door inner;
a trim panel fixed to the door inner;
an energy absorber having a vehicle-rearward end and a vehicle-forward end, the energy absorber being disposed between the door inner and the trim panel and elongated in a vehicle-forward direction from the vehicle-rearward end to the vehicle-forward end;
the energy absorber having a first energy-absorbing component defining a cavity facing the trim panel, and a second energy-absorbing component disposed in the cavity; and
wherein the energy absorber has a stiffness that decreases in the vehicle-forward direction;
wherein the second energy-absorbing component includes ribs spaced from each other and elongated transversely to the vehicle-forward direction; and
wherein the first energy-absorbing component includes a rear wall and side walls extending from the rear wall to define the cavity, and wherein the side walls and rear wall of the first energy-absorbing component includes an upward extension at the vehicle-rearward end, the cavity extending into the upward extension.

2. The vehicle door of claim 1, wherein the first energy-absorbing component includes a flange extending from the side walls and including fastener openings.

3. The vehicle door of claim 1, wherein the side walls extend from the rear wall at an angle equal to or greater than 90 degrees between the rear wall and the side walls in the cavity.

4. The vehicle door of claim 1, wherein the first energy-absorbing component has a thickness, and the thickness decreases in the vehicle-forward direction.

5. The vehicle door of claim 1, wherein the first energy-absorbing component has a density, and the density decreases in the vehicle-forward direction.

6. The vehicle door of claim 1, wherein the spacing of the ribs increases in the vehicle-forward direction.

7. The vehicle door of claim 1, wherein the second energy-absorbing component includes ribs spaced from each other and elongated in the vehicle-forward direction.

8. The vehicle door of claim 1, wherein the cavity has a first portion proximate the vehicle-rearward end and a second portion proximate the vehicle-forward end, and the second portion is devoid of ribs.

9. The vehicle door of claim 1, wherein the second energy-absorbing component has a thickness, and the thickness decreases in the vehicle-forward direction.

10. The vehicle door of claim 1, wherein the second energy-absorbing component has a density, and the density decreases in the vehicle-forward direction.

11. The vehicle door of claim 1, wherein one of the ribs includes a first material, one of the ribs includes a second material, and one of the ribs includes a third material, and wherein the first material is disposed in a vehicle-rearward direction relative to the second and third materials, the third material is disposed in the vehicle-forward direction relative to the first and second materials, and the second material is disposed between the first and third materials.

12. The vehicle door of claim 1, wherein one of the ribs includes a first amount of a material, one of the ribs includes a second amount of the material, and one of the ribs includes a third amount of the material, and wherein the first amount of the material is disposed in a vehicle-rearward direction relative to the second and third amounts of the material, the third amount of material is disposed in the vehicle-forward direction relative to the first and second amounts of the material, and the second amount of the material is disposed between the first and third amounts of the material.

13. The vehicle door of claim 1, further comprising a third energy-absorbing component disposed on an outer surface of the rear wall.

14. The vehicle door of claim 13, wherein the third energy-absorbing component has a thickness, and the thickness decreases in the vehicle-forward direction.

15. The vehicle door of claim 13, wherein the third energy-absorbing component includes a first material and a second material, the second material disposed in the vehicle-forward direction relative to the first material.

16. The vehicle door of claim 13, wherein the third energy absorbing component has a first amount of a material and a second amount of the material, and the second amount of the material is disposed in the vehicle-forward direction relative to the first amount of the material.

17. A vehicle door comprising:
a door inner;
a trim panel fixed to the door inner;
an energy absorber having a vehicle-rearward end and a vehicle-forward end, the energy absorber being disposed between the door inner and the trim panel and elongated in a vehicle-forward direction from the vehicle-rearward end to the vehicle-forward end;
the energy absorber having a first energy-absorbing component defining a cavity facing the trim panel, and a second energy-absorbing component disposed in the cavity; and
wherein the energy absorber has a stiffness that decreases in the vehicle-forward direction; and
wherein the second energy-absorbing component includes a first material and a second material abutting the first material between the first material and the first energy-absorbing component, wherein the first material decreases in thickness in the vehicle-forward direction, and the second material increases in thickness proportionally to the decrease in thickness of the first material.

18. A vehicle door comprising:
a door inner;
a trim panel fixed to the door inner;
an energy absorber having a vehicle-rearward end and a vehicle-forward end, the energy absorber being disposed between the door inner and the trim panel and elongated in a vehicle-forward direction from the vehicle-rearward end to the vehicle-forward end;
the energy absorber having a first energy-absorbing component defining a cavity facing the trim panel, and a second energy-absorbing component disposed in the cavity; and
wherein the energy absorber has a stiffness that decreases in the vehicle-forward direction; and
wherein the first energy-absorbing component includes a rear wall and side walls extending from the rear wall to define the cavity, and wherein the side walls and rear wall of the first energy-absorbing component includes an upward extension at the vehicle-rearward end, the cavity extending into the upward extension.

19. A vehicle door comprising:
a door inner;
a trim panel fixed to the door inner;
an energy absorber having a vehicle-rearward end and a vehicle-forward end, the energy absorber being disposed between the door inner and the trim panel and elongated in a vehicle-forward direction from the vehicle-rearward end to the vehicle-forward end;
the energy absorber having a first energy-absorbing component including a rear wall and side walls defining a cavity facing the trim panel, and a second energy-absorbing component disposed in the cavity; and
wherein the energy absorber has a stiffness that decreases in the vehicle-forward direction; and
wherein the rear wall of the first energy-absorbing component has a wall thickness, and the wall thickness decreases in the vehicle-forward direction.

20. A vehicle door comprising:
a door inner;
a trim panel fixed to the door inner;
an energy absorber having a vehicle-rearward end and a vehicle-forward end, the energy absorber being disposed between the door inner and the trim panel and elongated in a vehicle-forward direction from the vehicle-rearward end to the vehicle-forward end;
the energy absorber having a first energy-absorbing component defining a cavity facing the trim panel, and a second energy-absorbing component disposed in the cavity; and
wherein the energy absorber has a stiffness that decreases in the vehicle-forward direction; and
wherein the first energy-absorbing component has a density, and the density decreases in the vehicle-forward direction.

21. A vehicle door comprising:
a door inner;
a trim panel fixed to the door inner;
an energy absorber having a vehicle-rearward end and a vehicle-forward end, the energy absorber being disposed between the door inner and the trim panel and elongated in a vehicle-forward direction from the vehicle-rearward end to the vehicle-forward end;

the energy absorber having a first energy-absorbing component defining a cavity facing the trim panel, and a second energy-absorbing component disposed in the cavity;

wherein the energy absorber has a stiffness that decreases in the vehicle-forward direction; and a third energy-absorbing component, wherein the first energy absorbing component includes a rear wall, a side wall at the vehicle-rearward end, and a side wall at the vehicle-forward end, the side walls extending from the rear wall to define the cavity extending along the rear wall from one of the side walls to the other of the side walls in the vehicle-forward direction, and the third energy absorbing component is disposed on an outer surface of the rear wall and extends from the rear wall outwardly away from the cavity in a direction transverse to the vehicle-forward direction.

* * * * *